March 3, 1953  E. R. RACK ET AL  2,630,272
DAMPER REGULATOR

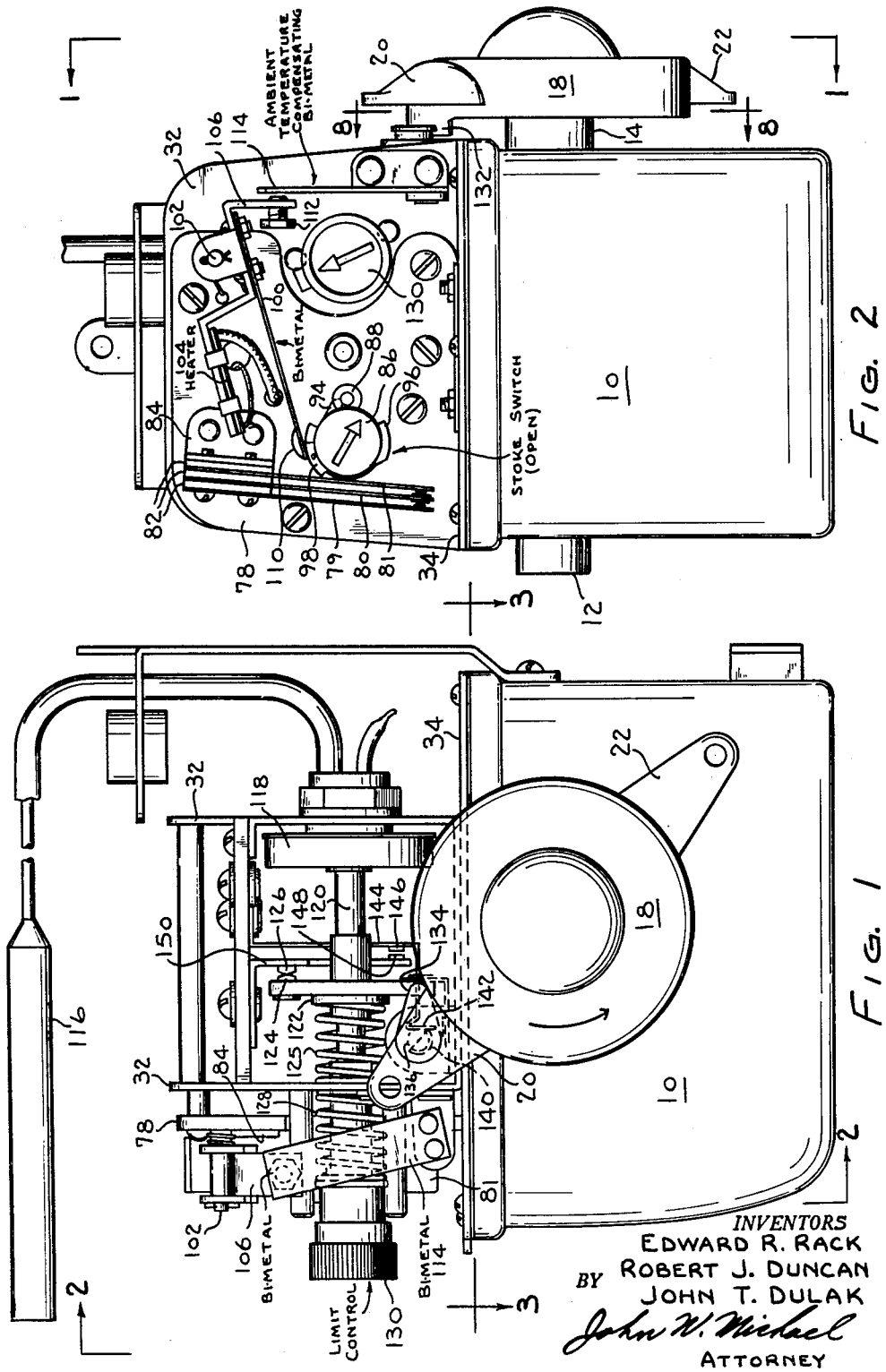

Filed Sept. 16, 1949  4 Sheets—Sheet 2

INVENTORS
EDWARD R. RACK
BY ROBERT J. DUNCAN
JOHN T. DULAK
John N. Michael
ATTORNEY March 3, 1953 E. R. RACK ET AL 2,630,272
DAMPER REGULATOR
Filed Sept. 16, 1949 4 Sheets-Sheet 3

INVENTORS
EDWARD R. RACK
BY ROBERT J. DUNCAN
JOHN T. DULAK
John N. Michael
ATTORNEY March 3, 1953     E. R. RACK ET AL     2,630,272
DAMPER REGULATOR Filed Sept. 16, 1949     4 Sheets-Sheet 4

*INVENTORS*
EDWARD R. RACK
BY ROBERT J. DUNCAN
JOHN T. DULAK

*John W. Michael*
ATTORNEY

Patented Mar. 3, 1953

2,630,272

UNITED STATES PATENT OFFICE 2,630,272

DAMPER REGULATOR

Edward R. Rack, Robert J. Duncan, and John T. Dulak, Milwaukee, Wis., assignors to A P Controls Corporation, a corporation of Wisconsin Application September 16, 1949, Serial No. 116,132

4 Claims. (Cl. 236—16)

This invention relates generally to a device for regulating the check and draft dampers on coal fired heating plants.

Damper regulators are generally under control of a thermostat. When there is no demand for heat the furnace is checked—the check is open and the draft door is closed. When the thermostat calls for heat an electric circuit including a motor is completed to move the dampers to the firing position with the check closed and the draft open. The firing position is maintained until the thermostat is satisfied.

Some regulators stall the motor in the firing position while others stop the motor in the firing position. The stalled motor type both overheats and hunts. The motor coil winding eventually deteriorates due to overheating. The hunting means that the true firing condition is not maintained. Those regulators which stop the motor in the firing position do not fail safe without additional mechanism complicating the installation.

An object of this invention is to provide a regulator which maintains the firing position without hunting.

Another object is to provide a regulator which fails safe.

A further object is to provide a regulator having a motor which runs cool, thus increasing motor life.

Still another object is to provide a damper regulator powered by a motor which neither stalls nor stops in the firing position.

A still further object is to provide a safe, efficient damper regulator which operates smoothly and quietly.

Another object is to provide a motor operated damper regulator which will not require oiling.

Damper regulators are preferably provided with a basement or stoke switch which may be manually operated to move the doors to firing position so the furnace may be stoked without smoke pouring into the basement. The stoke switch is preferably of the type which automatically trips out after a predetermined time interval to restore the regulator to thermostatic control. The basement switch may be tripped manually, but the automatic feature provides a safety factor.

Another object of this invention is to provide a simple basement switch which may be manually set and automatically or manually tripped out.

A further object is to provide a damper regulator stoke switch which is held closed by a bimetallic latch which warps to open the switch after a predetermined time interval regardless of the ambient temperature.

This regulator is additionally provided with a limit switch which eliminates danger of overheating. The limit switch may be responsive to air or water temperature or steam pressure. In the event the furnace is of the forced draft type a blower switch is provided to close the fan circuit to increase the draft.

Objects and advantages other than those above set forth will be apparent from the following description when read in connection with the accompanying drawing in which:

Figs. 1 and 2 are side and front elevations, respectively, of the regulator;

Figure 3:
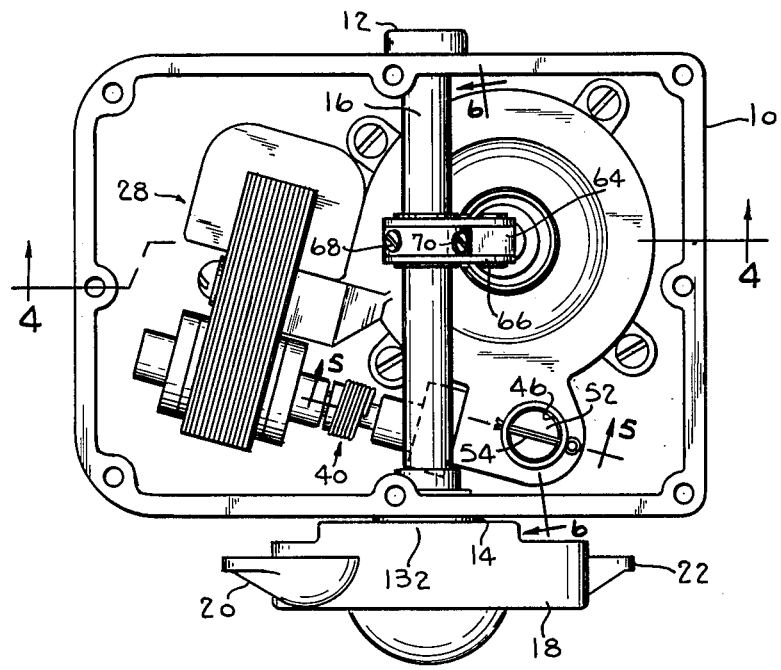
Fig. 3 is a plan view of the lower portion of the regulator.
Figure 4:
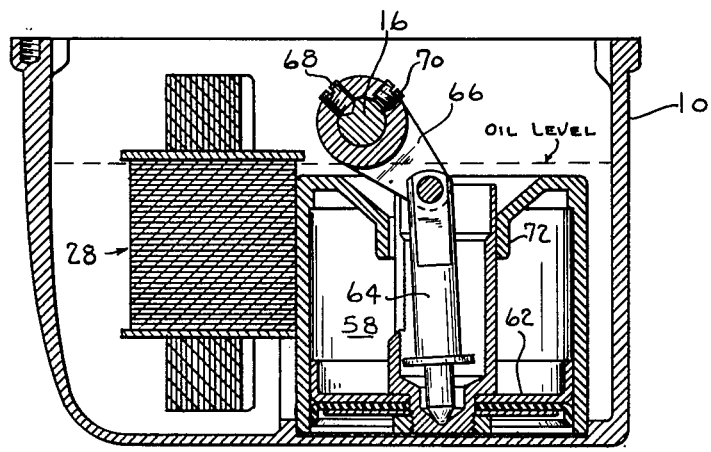
Figure 5:
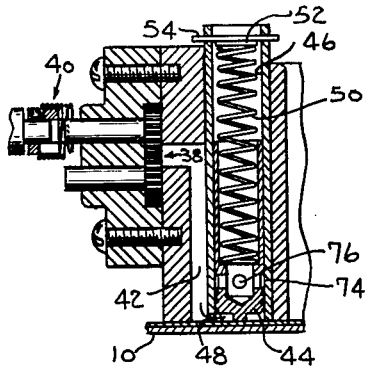
Figure 6:
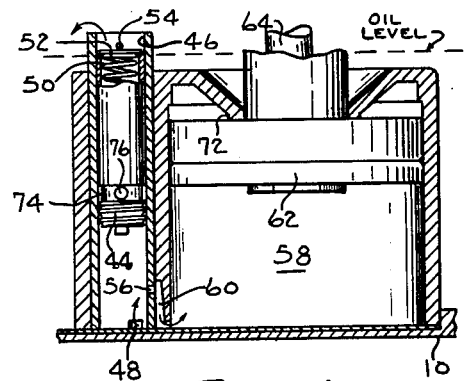
Figure 7:
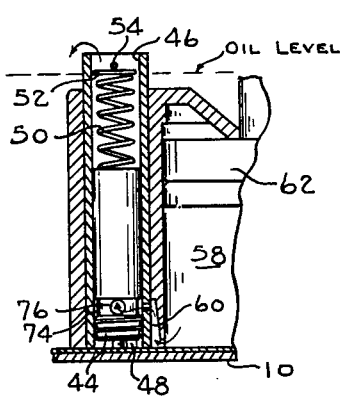
Figure 8:
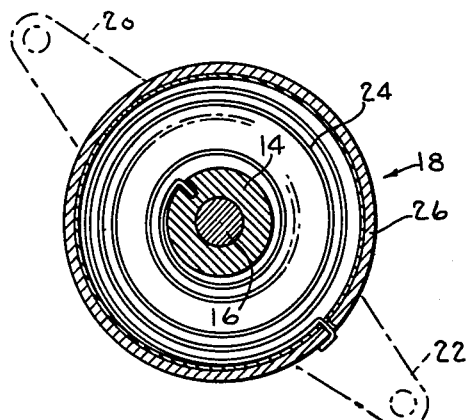
Figure 9:
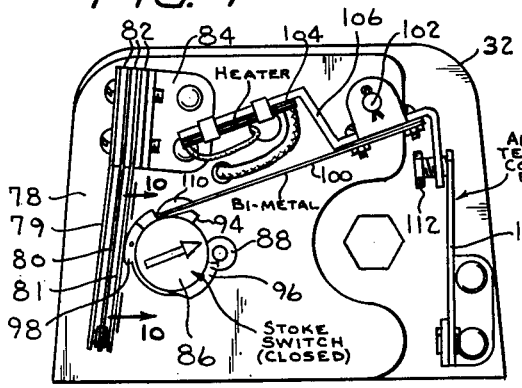
Figure 10:
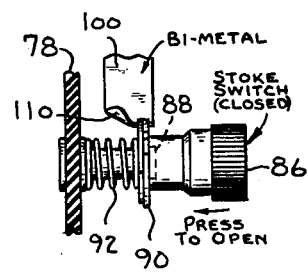
Figure 11:
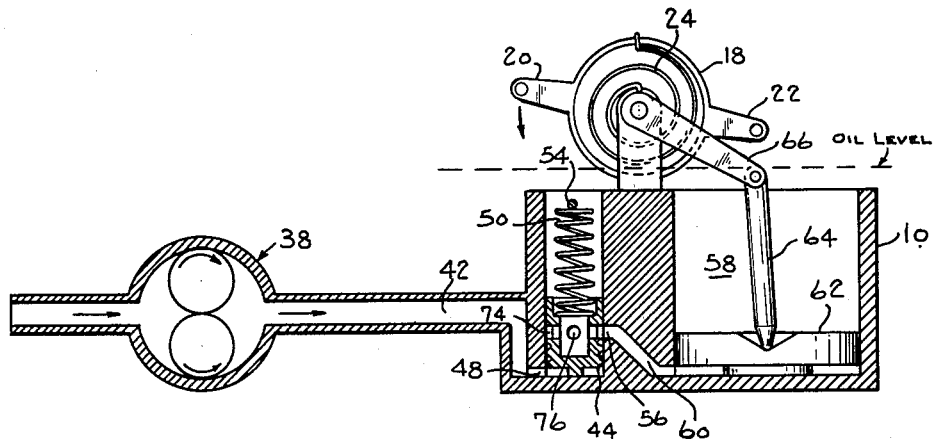
Figure 12:
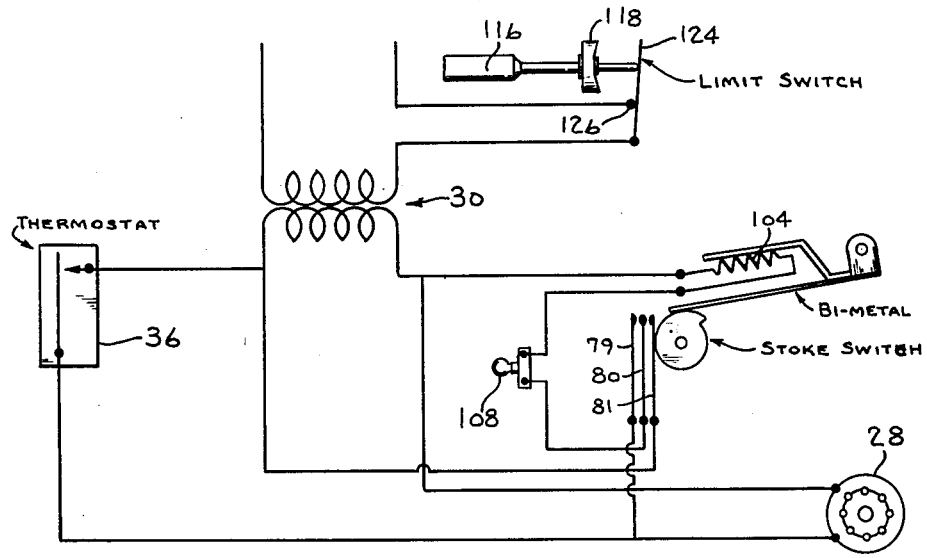
Figure 13:
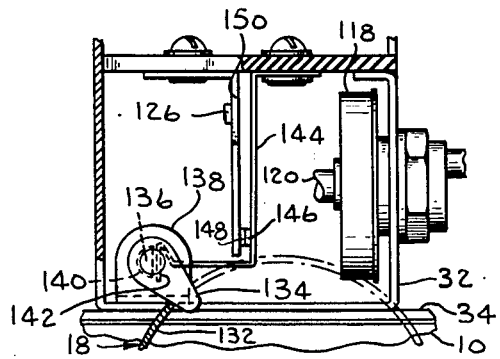

Figs. 4, 5 and 6 are sections respectively taken on lines 4—4, 5—5 and 6—6 in Fig. 3;

Fig. 7 is a fragmentary view similar to Fig. 6 but showing another relationship of the parts in the operation cycle;

Fig. 8 is a section taken on line 8—8 in Fig. 2;

Fig. 9 shows the stoke switch closed;

Fig. 10 is a view taken as indicated by line 10—10 in Fig. 9;

Fig. 11 is a schematic drawing of the hydraulic system;

Fig. 12 is a combined wiring diagram and schematic drawing of the regulator; and Fig. 13 is a fragmentary view which, in conjunction with Fig. 1, illustrates the operation of the blower switch.

Referring to the drawings in detail, the regulator is provided with casing 10 having bushings 12, 14 for shaft 16 carrying damper arm 18 at the side of the casing. The so-called damper arm has diametrically opposed arms 20, 22 which are adapted to be connected to the check and draft dampers by means of suitable chain or cable reeved in pulleys. Heavily tensioned spring 24 is hooked into bushing 14 and the damper arm flange 26 within the cupped back-side of damper arm 18. The arm is biased to the "checked" position shown in Figs. 1 through 3 by spring 24 and is adapted to be rotated through approximately 90° in the direction indicated by the arrow in Fig. 1 when motor 28 is energized. The motor is on the secondary or low voltage side of transformer 30 (Fig. 12) mounted on the left hand (Fig. 2) side of bracket 32 which is carried on casing cover plate 34 and secured to casing 10. Thus the transformer would appear in the background of Fig. 1 but has been omitted to clarify the showing of the other parts. Thermostat 36 (Fig. 12) is connected into the secondary of transformer 30 in series with low voltage motor 28.

When the thermostat closes and calls for heat, motor 28 is energized to drive gear pump 38 through spring coupling 40 which eliminates possible binding due to any misalignment of the shafts. Since the casing is filled with oil to the indicated level (below shaft 16 to eliminate leakage problems), the gear pump will deliver oil under pressure through conduit 42 to the underside of valve 44 in well 46 through the small hole 48 at the bottom of the well. As may be seen in Figs. 5, 6 and 7, valve 44 is biased to its lowermost position by means of spring 50 seated within the valve at one end and against seat 52 held in well 46 by means of pin 54. Seat 52 fits loosely within the well to allow for passage of oil around its periphery for a reason which will appear hereinafter.

The oil delivered under pressure from gear pump 38 to the underside of valve 44 will raise the valve against the force of spring 50 until small opening 56 in the side of the well is exposed to allow oil to flow into the bottom of cylinder 58 through conduit 60. The oil acts against the underside of piston 62 to lift the piston and impart rotational movement to damper arm shaft 16 through connecting rod 64 and crank 66 which is secured to the shaft by means of screws 68 and 70.

Piston 62 will be raised by the oil pressure until the piston abuts depending cylinder flange 72. At this point the pressure would normally tend to increase until electric motor 28 driving gear pump 38 stalled. However, means are provided for bleeding a small amount of oil from the delivery side of the gear pump to prevent stalling the motor and encountering the consequent hunting effect. Thus the lower end of valve 44 is threaded to provide a small capillary passage from the underside of the valve to annular groove 74 in the valve. Groove 74 communicates with the hollow upper portion of the valve through diametrical holes 76. Therefore, when piston 62 has reached its upper limit, the oil pressure builds up and forces valve 44 up against the spring force until it strikes pin 54 or until the spring force equals the pressure. Oil bleeds past the threaded tip of valve 44 into groove 74, through hole 76, and out of the top of well 46 back into the casing. Since but a small amount of oil can bleed past the valve tip, the pressure on the outlet side of the gear pump is held at a high value which imposes an additional load on the motor thus tending to slow it down, but the motor will in no event stall. Therefore, piston 62 is held in its upper position without hunting. The damper arm has been rotated through approximately 90° to open the draft and close the check.

When the thermostat is satisfied, the motor circuit is broken. The high pressure oil in the cylinder 58 immediately tends to bleed through the gear pump to relieve the pressure. When the pressure has dropped a small amount, the force of spring 50 is sufficient to move valve 44 down to the bottom of well 46 thus cutting off communication between cylinder 58 and the gear pump. It will be noted, however, that groove 74 now communicates directly with hole 56 and conduit 60 (Fig. 7). Since the force of damper arm spring 24 acts on piston 62, the oil in cylinder 58 flows rapidly out through apertures 76 in valve 44 and up through the hollow stem to spill over the top of well 46 to return the damper doors to the check position.

It will be apparent that the size of the oil passages and the depth of the threads on the valve tip may be varied to obtain the most desirable operating characteristics. The control is smooth and silent in operation and holds the doors in the firing position without any hunting effect. Should the current be interrupted, the device fails safe since it has the same effect as the thermostat opening.

The stoke switch is mounted on vertical terminal board 78 carried by bracket 32. The switching elements comprise three parallel resilient leaves 79, 80, 81 which are separated from each other by insulating blocks 82 and mounted on bracket 84. The outer extremities of switch elements 79, 80, 81 carry contacts which are normally separated (Fig. 2). Manual control knob 86 is positioned immediately adjacent the switch elements. Headed stop member 88 is positioned adjacent knob 86 to serve a two-fold function. The head overlies flange 90 fixed on knob 86 to limit outward movement of the knob in response to the force of compressed spring 92. Projections 94, 96 on control knob 86 are adapted to strike the shaft of stop 88 to limit rotational movement of knob 86. In addition to biasing the knob outwardly, spring 92 also tends to rotate the knob to the position shown in Fig. 2 where projection 94 abuts the shafts of stop 88. When stoke switch 86 is rotated counterclockwise (Fig. 2) cam surface 98 carried thereby acts against switch elements 79, 80, 81 to push the switch contacts together against the inherent resiliency of the elements (Fig. 9). At this time bimetallic latch 100 drops about its pivot 102 to engage the end of cam surface 98 and hold the stoke switch in the closed position (Fig. 9).

As may be seen in Fig. 12 rotation of the stoke switch to bring the switch contacts together shunts out the thermostat and causes current flow through two parallel circuits. One of these circuits includes heater 104 strapped under conductor 106 which is carried on shaft 102 with bimetallic latch 100. The heater branch may optionally include an indicator light 108 which serves as a warning when the basement switch has been closed. The other branch of the parallel circuit causes current flow through motor 28 to drive gear pump 38 and rotate damper arm 18 to move the check and draft doors to the firing position. The furnace may now be stoked without smoke pouring into the basement.

The heat from heater 104 is conducted to bimetallic latch 100 through conductor 106. This causes the latch to warp and after a predetermined time interval to disengage cam 98 on the stoke switch and permit spring 92 to rotate the switch back to its normal position and interrupt current flow through the parallel circuits. This restores the regulator to its normal condition under control of thermostat 36. However, the stoke switch may be manually returned to its normal position by pressing in against the force of spring 92 until switch cam 98 operates against up-turned corner 110 of the bimetallic latch and cams the latch upwardly as spring 92 rotates the knob. After switch cam 98 is disengaged from latch 100, spring 92 pushes the knob outwardly to return it to its normal position ready for another operation.

When the latch is in its normal position (Fig. 2) it rests on the top of stoke switch cam 98. When the switch has been closed (Fig. 9) calibrating screw 112 in the depending portion of conductor 106 abuts against compensating bimetal 114 mounted on bracket 32. The compensating bimetal responds to ambient temperature to provide a variable datum and compensate for any time deviations caused by ambient temperature changes. Therefore, the heater may be designed to automatically open the stoke switch after a predetermined time interval which will not vary with ambient temperature changes. Since the heat is conducted to the bimetallic latch, the interval can be held within very close limits.

The limit control comprises bulb 116 which is subjected to the temperature of the medium which is to be the limiting factor. A temperature increase will cause a corresponding pressure increase in the bulb which acts on snap diaphragm 118 to push pin 120 against shoulder 122 to move contact 124, in opposition to compression force of spring 125, away from contact 126 and break the high voltage circuit on the primary of the transformer. This, of course, interrupts current flow to the motor and permits the damper arm to rotate back to the checked position.

The response temperature of the limit control is regulated by varying the compression of spring 128. Manual control knob 130 is rotatably mounted on screw threading on the end of diaphragm pin 120 and provides a seat for spring 128 which also seats against the vertical portion of bracket 32. Thus as knob 130 is rotated, it moves in or out of the screw threading to increase or decrease the compression of spring 128 which tends to aid the diaphragm pressure. As knob 130 is rotated counter-clockwise from the position shown in Fig. 2, it moves outwardly to decrease the spring compression and therefore increase the response temperature of the limit control.

If the furnace is provided with a forced draft, the circuit to the blower cannot close until the doors are substantially in the firing position. Damper arm flange 26 is extended in one portion to provide cam surface 132 (Figs. 2 and 3). Follower 134 is fixed on the end of pin 136 rotatably mounted in bushings 138 secured to bracket 32. When damper arm 18 is in its normal position, cam 132 holds follower 134 in a position shown in Fig. 1. In this position cam 140 on shaft 136 bears against flat face 142 of blower switch element 144 to hold contact 146 from stationary contact 148 on conductor 150 (which also carries the high voltage contact 126 of the limit control). As damper arm 18 moves to the firing position when the thermostat calls for heat or the basement switch is closed, cam 132 holds the follower in position to keep the blower switch open until the damper arm has substantially reached the firing position. At this point (Fig. 13) cam 132 on the damper arm terminates permitting the follower to drop down and rotate cam 140 on shaft 136 away from switch element 144 to permit the inherent resiliency of the element to move contact 146 against the stationary contact 148 to complete the circuit to the blower. As soon as the damper arm starts the return movement to the checked position, follower 134 will be moved to break the blower circuit.

*Operation*

Considering first the normal operation under thermostatic control, it will be noted that closure of thermostat 36 energizes motor 28 to drive gear pump 38 and deliver oil to the underside of valve 44. Valve 44 is raised to expose port 56 in valve well 46 and permit oil to flow into cylinder 58 to lift piston 62 and rotate the damper arm to the firing position. When piston 62 has reached the limit of its upward movement, the pressure on the outlet side of the gear pump increases and exerts an additional load on the motor thus slowing the motor. The threaded tip on valve 44 permits a small amount of oil to bleed back into the oil reservoir by flowing through groove 74 and hole 76 into the hollow interior of the valve and out over the top of well 46. The capillary passage determined by the cooperation of the threaded valve tip and the wall of the well is designed to permit sufficient bleed to prevent stalling the motor while maintaining the pressure on the underside of piston 62 to hold the doors in the firing position.

When the thermostat is satisfied, the motor circuit is broken and for a short time oil will tend to flow back through gear pump 38. As soon as the pressure in the system is decreased a small amount, spring 50 returns valve 44 to its lower position (Fig. 7) where groove 74 communicates with port 56 to permit oil to flow rapidly from cylinder 58 out through the interior of the valve and over the top of well 46 as spring 24 within the damper arm forces piston 62 to its lower position. Thus the return to the checked position is more rapid than would be possible if the oil had to flow out through gear pump 38.

Basement switch 86, when rotated from its normal position (Fig. 2) to the closed position (Fig. 9), brings the contacts carried by leaf-like switch elements 79, 80, 81 together to shunt out the thermostat while establishing two parallel circuits. The stoke switch is held in the closed position by means of bimetallic latch 100. One branch of the parallel circuit causes current flow through heater 104 and light bulb 108, while the other branch causes current flow through motor 28 to drive gear pump 38 and move the damper arm to the firing position as described above. While the stoke switch is closed, heat is conducted from heater 104 to bimetallic latch 100 by conductor 106. After a predetermined time interval, latch 100 warps upwardly out of contact with switch cam 98 to permit spring 92 to rotate the switch back to its normal position and restore the regulator to thermostatic control. Bimetal 114 compensates for ambient temperature changes so that the action of heater 104 on bimetallic latch 100 is not affected by ambient changes, thereby insuring consistent time intervals on the automatic trip-out of the stoke switch.

The stoke switch may be manually tripped by pressing knob 86 inwardly until switch cam 98 operates against latch cam 110 to raise the latch and permit spring 92 to rotate the switch clockwise and to push the switch back out to its normal position ready for another operation.

Temperature variations felt by bulb 116 are resolved into pressure variations acting on diaphragm 118 which snaps outwardly, when the limiting temperature has been exceeded, to open contacts 124, 126 and break the primary circuit of the transformer. Rotation of limit control knob 130 varies the response temperature by changing the compression of spring 128 which tends to aid the diaphragm pressure.

Cam surface 132 is provided on the damper arm to hold the follower 134 in the position illustrated in Fig. 1 until the damper arm has rotated to the firing position to permit follower 134 to drop down as shown in Fig. 13. When the damper arm is in the checked position, cam 140 on shaft 136 carrying follower 134 operates against flat 142 on resilient switch element 144 to hold contact 146 from stationary contact 148 on the primary side of the transformer. However, when follower 134 drops down (Fig. 13) cam 140 moves away from flat 142 to allow the inherent resiliency of switch element 144 to bring contact 146 against contact 148 and close the circuit to the blower.

Since the regulator motor must run continuously to maintain the firing condition against the bias tending to return the dampers to the checked position, the firing condition is held without the hunting characteristic of the stalled motor type regulator and the regulator fails safe without requiring extra devices complicating the structure. It is to be noted that the stoke switch is designed to maintain the time interval allowed for stoking constant in spite of ambient temperature variations and without the use of a clock device. The motor bushings require no attention since they are immersed in oil. Similarly, the wear of other moving parts in the oil is reduced to a minimum. It will be apparent that this regulator may be modified in many ways without departing from the spirit of the invention. With this in mind the scope is to be determined only by the scope of the claims.

We claim:

1. A furnace damper regulator comprising, in combination, a damper actuator adapted for connection to the check and draft dampers of a furnace and being movable between a normal position in which the dampers check the fire and another position in which the dampers are in firing position, means biasing said actuator to said normal position, a cylinder, a piston in said cylinder and connected to said actuator, said piston being in a first position when said actuator is in said normal position and being in a second position when said actuator is in said other position, an electric motor, a liquid supply, a pump connected to said motor, conduit means connecting the outlet of said pump to said cylinder, valve means in said conduit means, a thermostat, an electric circuit including said motor and said thermostat, closure of said thermostat in response to heat demand being operative to energize said motor until the thermostat opens, said valve means being responsive to the pressure increase occasioned by operation of said pump to permit liquid to flow into said cylinder to move said piston to said second position, and means for bleeding oil from the delivery side of said pump to prevent the hydraulic pressure from increasing to the point where said motor stalls when said piston is in said second position and said actuator is in said other position, said valve means being responsive to the hydraulic pressure decrease incident to de-energization of said motor to vent said cylinder and permit liquid to flow rapidly from the cylinder as said piston and said actuator respectively return to said first and normal positions under influence of said biasing means.

2. A furnace damper regulator comprising, in combination, a damper actuator adapted for connection to the check and draft dampers of a furnace and being movable between a normal position in which the dampers check the fire and another position in which the dampers are in firing position, means biasing said actuator to said normal position, and electric motor, hydraulic means operatively connecting said motor and said actuator, a thermostat, an electric circuit including said motor and said thermostat, closure of said thermostat in response to heat demand being operative to energize said motor until the thermostat opens, said motor moving said actuator to said other position when energized, another circuit including said motor, normally open switch means operable to complete said other circuit when closed to energize said motor and move the actuator to said other position to permit stoking, bimetallic means for latching said switch means in closed position, said other circuit including a heater which is heated upon closure of said switch means, means for conducting heat from said heater to said bimetallic latch means to warp said latch after an interval of time, and means for bleeding liquid from said hydraulic means to prevent said motor from stalling when said actuator is in said other position.

3. A furnace damper regulator comprising, in combination, a damper actuator adapted for connection to the check and draft dampers of a furnace and being movable between a normal position in which the dampers check the fire and another position in which the dampers are in firing position, means biasing said actuator to said normal position, an electric motor, hydraulic means operatively connecting said motor and said actuator, a thermostat, an electric circuit including said motor and said thermostat, closure of said thermostat in response to heat demand being operative to energize said motor until the thermostat opens, said motor moving said actuator to said other position when energized, another circuit including said motor, normally open switch means operable to complete said other circuit when closed to energize said motor and move the actuator to said other position to permit stoking, bimetallic means for latching said switch means in closed position, said other circuit including a heater which is heated upon closure of said switch means, means for conducting heat from said heater to said bimetallic latch means to warp said latch after an interval of time, and means compensating said bimetallic latch means for ambient temperature to maintain said interval constant, and means for bleeding liquid from said hydraulic means to prevent said motor from stalling when said actuator is in said other position.

4. The combination with an electrically operated damper regulator adapted to control the check and draft dampers of a furnace for increased or decreased heat delivery, of a thermostat for controlling actuation of said regulator in accordance with heat demand of the medium heated by the furnace, of a panel, a plurality of normally separated resilient switch elements mounted on said panel and operable when moved into contact with each other to cause said regulator to increase the heat delivery from the furnace independently of said thermostat, a manually operable knob mounted on said panel for movement between first and second positions, a spring biasing said knob to said first position, a cam on said knob and operable to move said switch elements into contact with each other upon movement of said knob to said second position, a bimetallic latch engageable with said cam when said knob is in said second position to hold the knob in said second position, said latch being adapted to warp out of engagement with said cam when heated to permit said spring to return the knob to said first position, a heater energized upon movement of said switch elements into contact with each other, means for conducting heat from said heater to said latch, and means for compensating said bimetallic latch for ambient temperature to keep constant the time interval required to move the latch out of engagement with said cam.

EDWARD R. RACK.
        ROBERT J. DUNCAN.
        JOHN T. DULAK.

REFERENCES CITED

The following references are of record in the file of this patent:

UNITED STATES PATENTS

| Number | Name | Date |
|---|---|---|
| 1,926,680 | Kronmiller | Sept. 12, 1933 |
| 1,968,355 | Schaefer | July 31, 1934 |
| 2,020,618 | Persons | Nov. 12, 1935 |
| 2,210,144 | Day | Aug. 6, 1940 |
| 2,227,258 | Hilmer | Dec. 31, 1940 |
| 2,269,411 | Newton | Jan. 6, 1942 |
| 2,291,210 | Carlson | July 28, 1942 |
| 2,291,783 | Baak | Aug. 4, 1942 |
| 2,308,731 | White | Jan. 19, 1943 |
| 2,353,350 | Millerwise | July 11, 1944 |
| 2,412,218 | Hilmer et al. | Dec. 10, 1946 |